(12) United States Patent
Dunnous et al.

(10) Patent No.: US 6,596,072 B1
(45) Date of Patent: Jul. 22, 2003

(54) PRODUCT AND METHOD FOR COLORING CONCRETE

(75) Inventors: Jack Dunnous, Philadelphia, PA (US); William J. Yocum, Souderton, PA (US)

(73) Assignee: Hamburger Color Company, King of Prussia, PA (US)

( * ) Notice: Subject to any disclaimer, the term of this patent is extended or adjusted under 35 U.S.C. 154(b) by 0 days.

(21) Appl. No.: 10/100,390

(22) Filed: Mar. 18, 2002

Related U.S. Application Data

(60) Provisional application No. 60/333,635, filed on Nov. 27, 2001.

(51) Int. Cl.$^7$ .................................................. C09C 1/22
(52) U.S. Cl. ....................................... 106/456; 106/418
(58) Field of Search ................................ 106/416, 418, 106/456

(56) References Cited

U.S. PATENT DOCUMENTS

| | | | |
|---|---|---|---|
| 1,943,525 A | * | 1/1934 | Gundlach |
| RE20,776 E | | 7/1938 | Amon |
| 2,221,175 A | | 11/1940 | Bechtold |
| 2,981,636 A | * | 4/1961 | Lodge et al. |
| 3,068,109 A | | 12/1962 | Rodeffer |
| 3,843,380 A | | 10/1974 | Beyn |
| 4,162,287 A | | 7/1979 | Gunnell et al. |
| 4,277,288 A | | 7/1981 | Lawrence et al. |
| 4,308,073 A | | 12/1981 | Mills |
| 4,336,546 A | | 6/1982 | Edwards et al. |
| 4,366,139 A | | 12/1982 | Kühner et al. |
| 4,451,231 A | | 5/1984 | Murray |
| 4,946,505 A | | 8/1990 | Jungk et al. |
| 4,946,654 A | * | 8/1990 | Uhlemann et al. .......... 422/140 |
| 5,215,583 A | | 6/1993 | Kröckert |
| 5,401,313 A | | 3/1995 | Supplee et al. |
| 5,443,764 A | * | 8/1995 | Lloyd et al. .................. 264/15 |
| 5,484,481 A | | 1/1996 | Linde |
| 5,718,755 A | | 2/1998 | Köhler |
| 5,883,047 A | * | 3/1999 | Jaeger ....................... 504/116 |
| 6,079,644 A | | 6/2000 | Linde et al. |
| 6,132,505 A | | 10/2000 | Linde et al. |

FOREIGN PATENT DOCUMENTS

| | | |
|---|---|---|
| DE | 29 40 156 A1 | 4/1980 |
| FR | 2 450 273 B | 3/1980 |
| JP | 53-149224 A | 12/1978 |
| JP | 58-125759 | 7/1983 |

OTHER PUBLICATIONS

Caldarone, Gruber, Burg, High–Reactivity Metakaolin: A New Generation Mineral Admixture (No date available).
Virginia Transportation Research Counsel, "Combinations of Pozzolans and Ground, Granulated, Blast–Furnace Slag for Durable Hydraulic Cement Concrete", Report No. 00–R1, Feb. 2000.
"What Makes MetaMax® High Reactivity Metakaolin Stand Out? Let us Enlighten You", *brochure* of Engelhard Corp. 1999, EC–7387.
"MetaMax® PA" *brochure* Engelhard, (unknown date).
Hooton, Gruber, Boddy, "Chloride Penetration Resistance of Concrete Containing High–Reactivity Metakaolin" (Abstract) *Proceedings of the PCI/FHWA, International Symposium on High Performance Concrete*, New Orleans, LA, Oct. 20–22, 1997, p. 172.
Caldarone, Gruber "High Reactivity Metakaolin—A Mineral Admixture for High–Performance Concrete", (Abstract) *Concrete Under Severe Conditions: Environment and loading*, (Vol. Two), 1995, E&FN Spon. ISBN 0 419 19860 1.
"Benefits of MetaMax® High Reactivity Metakaolin: Addition vs. Replacement", Engelhard Corp., NJ, C7–E–6/98 (Date unavailable).
Thomas, Gruber, Hooton, "The Use of High Reactivity Metakaolin in High Performance Concrete", Abstract, p. 517 (Date unavailable).

* cited by examiner

*Primary Examiner*—Paul Marcantoni
(74) *Attorney, Agent, or Firm*—Caesar, Rivise, Bernstein, Cohen & Pokotilow, Ltd.

(57) ABSTRACT

Pigment-containing granules for use in coloring cement. The granules comprise at least one pigment selected from the group consisting of maganese oxide and iron oxide and a binder. The binder is a hydrophilic clay, and is preferably pozzolan.

9 Claims, No Drawings

PRODUCT AND METHOD FOR COLORING CONCRETE

SPECIFICATION

This application claims the benefit of the filing date of U.S. provisional Application Serial No. 60/333,635, filed on Nov. 27, 2001.

BACKGROUND OF THE INVENTION

This invention relates to a product and method for dyeing concrete.

For the purposes of this invention, concrete is a cement-containing material for making concrete blocks and concrete slabs, concrete roofing tiles, composite blocks, as well as fibrated cement mortar and/or cement mortar.

Concrete is a proven material of construction and as exposed concrete serves also for aesthetic purposes. Exposed concrete made from a dyed concrete mix will keep its color for many years without need for maintenance.

Concrete is dyed with inorganic pigments, and, more recently, also with organic pigments. Pigments which are suitable for concrete and have proved satisfactory for a prolonged time are manganese oxide, iron oxides and titanium dioxide.

One of the problems of utilizing pigments in the production of dyed concrete is the formation of dust. Dust is raised from the pigment powder and its use results in a soiling of human beings, machines and the surrounding premises. One of the solutions to the dust problem is to form the pigments into granules through the use of a binder. The granular pigment is virtually dust-free, yet will easily flow for mixing with cement to form concrete.

In U.S. Pat. No. 4,946,505 a method is disclosed for forming pigment granules composed of a pigment and a water soluble, organic binder such as lignin sulfonate. The granules disclosed in this patent are formed by a spray drying process. In use, the granules are mixed with cement and water to form a dyed concrete.

Another form of pigment granules used for dyeing concrete is disclosed in U.S. Pat. No. 5,484,481. This patent discloses pigment granules formed from pigments and binders. The binders can be aqueous solutions of at least one inorganic salt taken from the group consisting of phosphate silicates, aluminates and borates. The inorganic salts are all disclosed as being in solution and, accordingly, are water-soluble.

U.S. Pat. No. 5,215,583 also discloses pigment granules for dyeing concrete. The granules of this patent are formed from a pigment and a binder formed from a soluble inorganic salt, such as chlorides, sulfates and phosphates.

U.S. Pat. No. 5,718,755 also discloses pigment granules for dyeing concrete. The granules consist of a pigment and a binder which is a soluble phosphate, silicate or sulphate.

In all of the patents discussed above, where granules are used to solve the dust problems, the binders are water-soluble. U.S. Pat. No. 4,946,505 points out that the soluble binders disclosed therein are dispersing agents, in that they promote the dispersal of the pigment within the concrete.

The granule of this invention enjoys all of the advantages of use of the granules disclosed in the patents discussed above. However, rather than utilizing a soluble binder, the granule of this invention utilizes an insoluble, pozzolanic clay agglomerator. The clay is pozzolanic aluminum silicate.

Although mixtures containing a pozzolan, a pigment and a dispersing agent have been shown to be useful in dyeing concrete, in U.S. Pat. No. 3,068,109, the composition used to dye concrete disclosed in the patent is a powdered mixture. The three components of the powder must be inter-ground before they are added to the concrete mixture, and thus being in a powder form, they will suffer all of the problems of the prior art powdered pigments. These problems were overcome by utilizing the pigment granules disclosed in the patents discussed above.

The pigment granules of this invention operate through a different mechanism from the granules made using a soluble binder of the above patents. Forming granules with a soluble organic binder, such as that disclosed in U.S. Pat. No. 4,946,505, presents potential production problems. The granules of that patent are produced by a spray drying method, during which they are subjected to high temperature air flow for efficiently drying the excess water they contain. Organic substances will burn or char when exposed to temperatures over 400° F. When such exposure occurs, the binder will not be readily soluble in water. Solubility is a condition needed to break the granule bond and free the pigment particles in the concrete to achieve a fast mixing process.

Spray dryers are known to use drying air temperatures well beyond the safe level for organic materials. When using lignin sulfonate for a binder, which is a preferred binder in U.S. Pat. No. 4,946,505, the operating temperature and exposure duration have to be carefully controlled during the spray drying process to prevent burning the lignin sulfonate. However, the temperature must be high enough to dry the pigment granule in a relatively short time. This is a critical condition that presents a limited window for processing. Organic binders, such as lignin sulfonate, are also known to negatively affect the hydration of the cement in the concrete and promote undesirable efflorescence, and it is important not to exceed a certain critical level.

The process limitations are eliminated when utilizing the aluminum silicate complex of this invention. Aluminum silicate clays are naturally formed, and maybe refined by further processing. The clay has to be hydrophilic or hydraulic to allow its incorporation in the water suspension used in either of the granulating processes disclosed hereinafter. Examples of pozzolanic clays usable in this invention are bentonite and metakaolin, which is subsequently calcined.

Unlike organic binders, clays do not effect negatively the hydration of the cement. Hydraulic pozzolan clays enhance the concrete properties. Pozzolans, which are silicate rich, lime poor, react with the calcium hydroxide, produced by cement hydration, to produce cementitious sites locked to the cement structure.

Clays can withstand very high temperatures and are not affected by the processing temperatures used in the production of granulated pigments. The possible burning and charring of the binder is thus avoided. Because clays are not film forming, water can easily penetrate the crystalline structure of the granule, and quickly break down the bond between pigment and clay.

SUMMARY OF THE INVENTION

Pigment-containing granules comprising at least one pigment selected from the group consisting of manganese oxide and iron oxide and an agglomerator, said agglomerator comprising a hydrophilic clay.

DETAILED DESCRIPTION OF THE INVENTION

The clay used as an agglomerator for the pigment is inorganic and insoluble in water. A preferred clay is calcined pozzolan clay, which is hydrophilic (hydraulic). That is, it will readily absorb water. A preferred clay is hydrophilic pozzolanic aluminum silicate.

The pozzolanic aluminum silicate is naturally occurring. It is further processed by calcining, that is, heating to temperatures in excess of 1000° C. The high temperature will burst the clay particle, increasing its surface area and turning it into a highly absorbent material. The pozzolanic attribute of the clay causes it to react with the calcium oxide present in the cement, which enables it to anchor itself to the hydrating cement.

The granules are used in the same manner as the pigment-containing granules of the prior art. Thus, they are mixed with water and cement to form colored concrete.

The granules formed from the pozzolanic clay have a number of advantages over the prior art granules containing soluble binders. The clay forms additional cementitious sites locking the color into the concrete. This results in improvement in the physical performance of the concrete. Unlike the organic binders, pozzolan clays do not have any adverse effect on the concrete.

The prior art soluble organic binders are film-forming around the pigment particles. When used to color cement, the process is time-dependent on the dissolution of the film binder. Contrasted with this, water readily penetrates the clay granule between the pigment particles and re-wets the clay, freeing the pigment particles to allow them to mix promptly with the cement in the formation of the concrete.

Although the pozzolanic aluminum silicate clay can broadly be referred to as an agglomerator, it could best be described as being a nucleating agent which causes several pigment particles to adhere to each particle of clay during the process forming the granule. The granules of this invention have sufficient strength to survive transportation and dispensing, while at the same time being able to quickly release the pigment to color the concrete when mixed with cement and water.

The critical aspect of the clay is that it must be hydrophilic. Pozzolanic clay, metakaolin and bentonite are preferred. Hydrophobic clay cannot be used, as it cannot form a usable suspension for the process of making the granules or the use of the granules in dyeing concrete.

In formulating the granules, an optional ingredient is a water reducer, which aids in the preparation of a high solid (50% minimum) pigment slurry. Any known wetting agent can be used for this purpose. Acceptable water reducers include naphthalene sulfonate, triethanolamine and a solution of an ammonium salt of an acid copolymer, sold under the trademark BYK156.

The granules of this invention can be prepared by conventional production methods, using a pin mixer, rotating pelletizing plate, inclined rotating granulating plate or spray drying. The particle size of the granules will be between approximately 20 and 1,000 microns when using a pin mixer and between 20 and 500 microns when using a spray drying process. Specific examples of each of the processes will now be given.

EXAMPLE 1

In this example, the granules are formed by a pin mixer method. Dry iron oxide pigment was loaded into a ribbon blender feeding a screw conveyor which in turn fed a dry powder metering screw. The metered pigment was then directed into the inlet of a pin mixer. The pin mixer has a dimension of 12" in diameter and 54" long. It is powered by a 40 hp. variable speed electric motor with a maximum speed of 1750 rpm. and is rated at 40 cubic feet per hour.

Hydraulic pozzolanic aluminum silicate clay was mixed with water at the ratio shown below and was sprayed into the chamber of the pin mixer at rates commensurate with the specific formula used. Pigment granules emerged from the mixer outlet carrying excess water as indicated by the respective formula. The wet granules were then passed through a dryer and emerged with a moisture content below 5%. The clay granules were then packaged on line in semi-bulk totes.

The emerging granules had excellent flowing characteristics, minimum dust, resisted break-up due to handling and, when wetted out, readily freed the pigment for mixing with the wet concrete. The particle size could be controlled by the speed of the pin mixer, the pigment rate and pigment to water ratio. Granule sizes up to 1500 microns were possible to produce.

The pin mixer process requires that the flow of water/clay mix to pigment be held constant. It was observed that the torque of the pin mixer motor increases when the granules become too wet and decreases when the granules are dry and powdery. A programmable controller can be used to control the water/clay slurry pump through motor torque feedback to maintain an optimum torque level of the granule.

Three iron oxide pigments, red, yellow and black, were used in three separate runs, utilizing the following process settings:

Pin mixer speed: 1,000 to 1,200 rpm.

Dryer inlet temperature: 320° F.

Granules temperature at dryer entry: 100 to 120° F.

Granules discharge temperature: less than 100° F. (dryer has cooling section)

Raw materials input rates and ratios:

| Component | Red | Black | Yellow |
| --- | --- | --- | --- |
| Pigment, lbs./hr. | 1,600 | 1,200 | 800 |
| Agglomerator, lbs./hr. | 40 | 30 | 20 |
| Water, lbs./hr. | 224 | 216 | 160 |
| Agglomerator/Water spray rate, lbs./hr. | 264 | 246 | 180 |

The final products were granules comprising 94.5% pigment, 2.5% clay and 3% water.

EXAMPLE 2

In this example, the granules are formed by a spray drying method. A water slurry of 36% red iron oxide pigment, 0.9% hydraulic clay and 63.1% water was mixed in a tank feeding the spray nozzle of a spray drying tower, which was 24' in diameter and 65' high. The inlet drying temperature of the tower was controlled to about 400° F. Fine pigment granules, mostly of 20 to 250 microns, were produced at a rate of 1200 lbs./hr. The granules retained their structural integrity when tested for physical strength, but disintegrated readily in water. The iron oxide pigment and hydraulic clay used in this method were the same as those used in the pin mixer method. The final water content was 2.5%.

EXAMPLE 3

This example involves an improved spray drying method. While utilizing the spray drying method described in Example 2, the production rate of 1200 lbs./hr. was lower than the desired target. This was the result of not being able to incorporate more than 36% pigment in the water slurry. The excess water required a longer drying time for reduction to the required final level of less than 5%.

As is known in the art of slurry preparation, a water reducer would be needed to reduce the amount of water in the fluid mix, to achieve the proper spraying viscosity. A water reducer (BYK 156—described above) was added in the amount of 1% to the slurry used in the above method, which allowed the increase of the pigment content to 50%. The production rate was increased to over 2,000 lbs./hr. There was no change in the granule characteristics. It should be noted that other iron oxide pigments vary greatly and thus may require different levels of the water reducer to allow a 50% or high loading. The choice of pigment is based on final cost effectiveness.

The most efficient slurry for this method is one with high pigment loading and low spraying viscosity. This improved process was applied to the other pigments to be granulated and obtained the same improved higher productivity.

Formulations used in the final runs were:

| Components in the slurry | Red | Black | Yellow |
| --- | --- | --- | --- |
| Pigment | 50% | 50% | 45% |
| Hydraulic Clay | 1.25% | 1.25% | 1.25% |
| BYK 156 | 1.0% | 1.0% | 4% |
| Water | 47.75% | 47.75% | 49.75% |

The granules produced by this method will have the following composition:

Water: 1 to 3%

Clay agglomerator: 2 to 4% (could be higher with certain pigments)

Pigment: 93 to 97% (or balance)

BYK 156: 1 to 4%

The hydrophilic hydraulic clay used in this method and the methods of Examples 1 and 2 is a pozzolan.

The structure of the clay granule of this invention is crystalline where the pigment and clay particles are agglomerated together. Unlike the granule formed by utilizing soluble organic binders, the clay agglomerator is not a film formed around the bound particles. The clay acts as an agglomerater. The formation of this invention eliminates the requirement of the time dependent dissolution of a film binder, such as lignin sulfonate. Water readily penetrates the clay between the pigment particles and re-wets the clay, freeing the pigment particles to allow them to mix with the concrete.

The percentage of clay in the granules can vary from 2 to 4%. A preferred percentage is 2.5%.

The percentage of water in the granules can range from 1 to 5%, with the preferred percent being approximately 3%.

The granules are used to color concrete in the same manner as in the prior art patents discussed above. Sand, aggregate or gravel can be placed in a concrete mixer and the granules of this invention, Portland cement and water can be added to the mixer. After mixing for the appropriate time, the mixer is emptied and the mix is poured into molds for making the appropriate products, such as concrete blocks or roofing tiles. The entire mixture is homogeneous at the time that the concrete mixer is emptied.

Without further elaboration, the foregoing will so fully illustrate this invention that others may, by applying current or future knowledge, readily adapt the same for use under various conditions of service.

We claim:

1. A pigment-containing granule for use in coloring cement consisting essentially of at least one pigment selected from the group consisting of manganese oxide and iron oxide and an agglomerator, said agglomerator comprising a hydrophilic clay.

2. The granule of claim 1 wherein the hydrophilic clay is an aluminum silicate clay.

3. The granule of claim 1 wherein the hydrophilic clay is pozzolan.

4. The granule of claim 3 wherein the pozzolan is selected from the group consisting of bentonite and metakaolin.

5. The granule of claim 3 wherein the pozzolan is calcined.

6. The granule of claim 1 wherein the pigment comprises 93% to 97% by weight, the agglomerator comprises 2% to 4% by weight and water comprises 1% to 5% by weight.

7. The granule of claim 6 and further including a water reducer, said water reducer being present in the range of 1% to 4% by weight.

8. A pigment-containing granule for use in coloring cement consisting essentially of at least one pigment selected from the group consisting of manganese oxide and iron oxide, an agglomerator, and a wetting agent, wherein said agglomerator comprises a hydrophilic clay.

9. The granule of claim 8, wherein the wetting agent is selected from the group consisting of naphthalene sulfonate, triethanolamine and a solution of ammonium salt of an acid copolymer.

* * * * *